(12) United States Patent
Houldsworth

(10) Patent No.: US 6,557,091 B2
(45) Date of Patent: *Apr. 29, 2003

(54) DATA PROCESSOR WITH LOCALIZED MEMORY RECLAMATION

(75) Inventor: Richard J. Houldsworth, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 6 days.

This patent is subject to a terminal disclaimer.

(21) Appl. No.: 09/866,819

(22) Filed: May 29, 2001

(65) Prior Publication Data

US 2001/0039609 A1 Nov. 8, 2001

Related U.S. Application Data

(63) Continuation-in-part of application No. 09/138,780, filed on Aug. 24, 1998, now Pat. No. 6,304,949.

(30) Foreign Application Priority Data

Aug. 22, 1997 (GB) .............................. 9717715

(51) Int. Cl.[7] .............................................. G06F 12/02
(52) U.S. Cl. ...................................... 711/170; 707/206
(58) Field of Search ............................... 711/170, 173, 711/121, 132; 707/205, 206

(56) References Cited

U.S. PATENT DOCUMENTS

| 5,848,423 A | 12/1998 | Ebrahim et al. ............ 707/206 |
|---|---|---|
| 5,968,157 A | 10/1999 | Joy et al. ..................... 710/200 |
| 6,237,060 B1 * | 5/2001 | Shilts et al. ................. 707/206 |
| 6,304,949 B1 * | 10/2001 | Houlsdworth ............... 707/206 |
| 6,353,838 B2 * | 3/2002 | Sauntry et al. ............. 707/206 |
| 6,393,440 B1 * | 5/2002 | Salant et al. ................ 707/206 |

OTHER PUBLICATIONS

"Garbage Collection Algorithms for Automatic Dynamic Memory Management", by Jones et al, John Wiley & Sons 1996, ISSBN 0-471-94148-4, pp. 1-18.

"Uniprocessor Garbage Collection Techniques", by Paul R. Wilson, Proceedings of the 1992 International Workshop on Memory Management, St. Malo, France, Sep. 1992.

\* cited by examiner

Primary Examiner—Matthew Kim
Assistant Examiner—Yamir Encarnacion

(57) ABSTRACT

A data processing apparatus for handling multi-thread programs comprises a data processor coupled with a random-access memory containing a plurality of data objects. Each data object is accessed via respective pointers carried by memory stacks associated with respective threads. Periodically, a garbage collection procedure is applied to the random-access memory with those data objects having no extant pointers thereto from any source being identified and deleted. Subject to a locking constraint applied to some of the data objects, the remainder are compacted to free space in the memory. To enable localising of the garbage collection procedure, reference stacks are provided for each thread stack frame such as to identify, preferably via a per-thread reference table, data objects referenced from only a single frame, which objects are deleted on conclusion of that frame.

15 Claims, 7 Drawing Sheets

DATA PROCESSOR WITH LOCALIZED MEMORY RECLAMATION

CROSS REFERENCE TO RELATED APPLICATION

This is a continuation-in-part of application Ser. No. 09/138,780, filed Aug. 24, 1998, now U.S. Pat. No. 6,304,949.

The present invention relates to a method and apparatus for handling stored data and particularly, but not exclusively, to memory compaction and garbage collection in real or virtual memory space of a data processing apparatus.

BACKGROUND OF THE INVENTION

Garbage collection is the automated reclamation of system memory space after its last use by a programme. A number of examples of garbage collecting techniques are discussed in "Garbage Collection: Algorithms for Automatic Dynamic Memory Management" by R. Jones et al, pub. John Wiley & Sons 1996, ISBN 0-471-94148-4, at pages 1 to 18, and "Uniprocessor Garbage Collection Techniques" by P. R. Wilson, Proceedings of the 1992 International Workshop on Memory Management, St. Malo, France, September 1992. Whilst the storage requirements of many computer programs are simple and predictable, with memory allocation and recovery being handled by the programmer or a compiler, there is a trend toward languages having more complex patterns of execution such that the lifetimes of particular data structures can no longer be determined prior to run-time and hence automated reclamation of this storage, as the program runs, is essential.

One particular class of garbage collection/memory reclamation techniques, as described in the above-mentioned Wilson reference, is mark-sweep collection. In common with many garbage collection techniques it is a two-stage procedure and, as its name suggests, it involves first marking all stored objects that are still reachable by tracing a path or paths through the pointers linking data objects, and then sweeping the memory—that is to say examining every object stored in the memory to determine the unmarked objects whose space may then be reclaimed. In other techniques, such as mark-compact and copying collection, the stored data objects are moved around in memory to form contiguous areas of "live" objects and garbage, with the garbage area being freed for overwriting.

In many cases, garbage collection is a system-wide task which operates on a single global heap, that is to say a single memory area where data structures or objects are stored in no specific order—only with regard to whether a particular space is large enough to hold a particular object. Many languages have no concept of local storage of objects and therefore the global heap will be used for many short-lived data objects, for example those which are local to a single thread. As the same garbage collection or data object sorting techniques are typically applied to this category of data as to longer term data shared between threads, overall collection times may become very long and the load for processing this local data is transferred to the system-wide garbage collection process.

SUMMARY OF THE INVENTION

It is an object of the present invention to provide a means whereby the efficiency may be increased by distributing the processing load typically involved in garbage collection in a multi-threading environment.

In accordance with the present invention there is provided a data processing apparatus for handling multi-thread programs, the apparatus comprising a data processor coupled with a random-access memory containing a plurality of data objects, each said data object being at a respective known location within the memory and being accessed via respective pointers carried by memory stacks associated with respective threads, the apparatus being configured to periodically determine those data objects in the random-access memory having no extant pointers thereto from any source and to delete the same; characterised in that the apparatus further comprises a plurality of reference buffers, each assigned to a respective memory stack frame, each reference buffer holding pointers to each data object referred to by the respective stack frame, the apparatus being configured to clear, at the conclusion of each thread memory stack frame, the associated reference buffer and each referenced data object having no pointers thereto in any other reference buffer.

Through the use of reference buffers for each thread, those data objects referred to only by the one thread may be deleted as soon as the relevant thread memory stack section (stack frame) has cleared. In this way, these singly referenced objects may be garbage collected on a "local" basis rather than congesting a global garbage collection. There is one exception to this, where pointers remain in other data objects even after all those from the stack have been cleared. To provide for this, each stored data object may include a so-called global flag set by the presence of a pointer to the data object from another data object, with the apparatus being further configured to exclude from clearance any data object having its global flag set.

In an embodiment to be described, an additional data store holding a handle table may be provided, with each referenced data object containing a pointer to a handle table entry, and each handle table entry holding a pointer to the location within the random access memory of the respective data object. With such a handle table, the apparatus may further comprise means operable to determine the number of pointers from reference buffers to each data object and to store this number as a reference count with the entry for that data object in the handle table. Alternatively, means operable to determine the number of pointers from reference buffers to each data object may be provided, but with a further data store holding this number as a reference count entry for the respective data object; in this latter case the handle table pointer to the data object location may be comprised of a pointer to the further data store reference count entry and a further pointer from that entry to the data object in the random access memory.

In an alternative configuration, the stored data objects may be kept relatively simple, that is to say without storing a pointer to a handle table entry, or any other pointers. In such a configuration, the link to the handle table entry may suitably be provided by a further pointer from the respective entry in the or each reference buffer.

The apparatus preferably includes means arranged to periodically compact the random access memory contents by moving the undeleted data objects: to avoid disturbing objects that may be required by other threads, the compaction means preferably leaves unmoved any data object with an associated reference count value greater than zero. To indicate this to the compactor, each stored data object may suitably include a lock flag which, when set, indicates a reference count value greater than zero. In a further alternative, the lock flag may instead be held by the handle table, in order to keep the size of each data object to the minimum. Further compaction may be provided if each reference buffer is of a predetermined capacity, with the apparatus further comprising means operable to detect when a reference buffer reaches fullness and arranged to perform garbage clearance for the buffer prior to conclusion of the thread memory stack frame.

In a further embodiment to be described, a further data store may be provided holding, for each thread, a respective thread reference table holding individual entries respectively marking each object referenced by the thread. With such a thread reference table, each reference buffer suitably holds, for each referenced data object, a pointer to the respective thread table entry. With such an arrangement, the above-described functionality of the reference structures is split into the reference buffer per stack frame and thread table per thread. This arrangement acts as an interface to a stack for garbage collection purposes, supporting low-overhead reference counting and removing the need for conservative scanning of the stack.

Also in accordance with the present invention there is provided a method of memory management for use in data processing apparatuses handling multi-thread programs, wherein the memory contains a plurality of data objects, each said data object being at a respective known location within the memory and being accessed via respective pointers carried by memory stacks associated with respective threads, the method comprising periodically determining those data objects in the random-access memory having no extant pointers thereto from any source and to delete the same; characterised in that, for each memory stack, reference pointers are generated for each data object referred to by the respective stack and, at the conclusion of handling of each thread memory stack frame, the associated reference pointers and each referenced data item having no other reference pointers thereto are deleted. Further features of the present invention are described in the attached claims.

BRIEF DESCRIPTION OF THE DRAWING

The invention will now be described by way of example only, with reference to the accompanying drawings, in which.

DETAILED DESCRIPTION OF THE PREFERRED EMBODIMENTS

Figure 1:
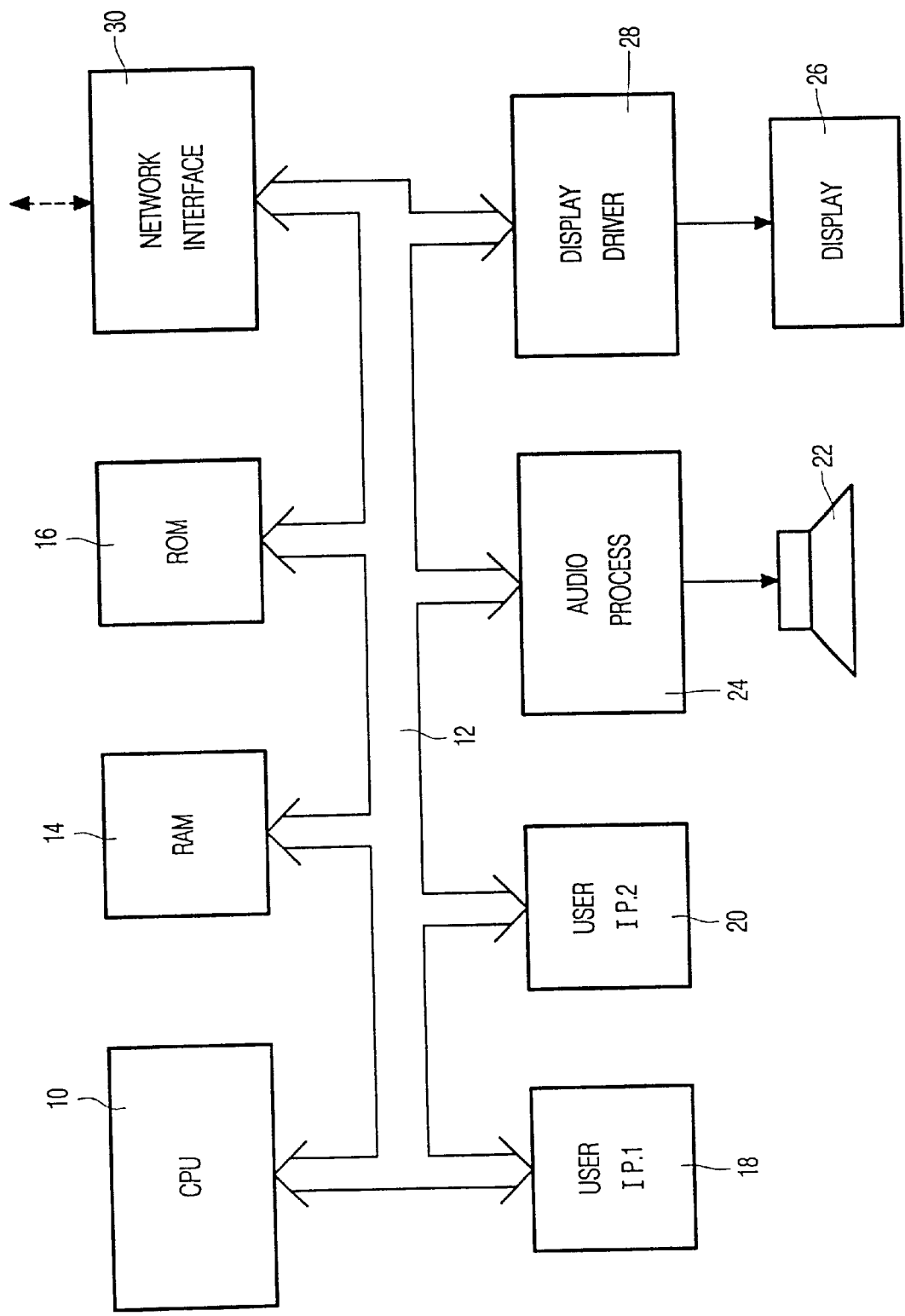
FIG. 1 is a block diagram of a data processing system suitable to embody the present invention.

FIG. 1 represents a data processing system, such as a personal computer, which acts as host for a number of software utilities which may, for example, configure the system as a browser for data defining a virtual environment. The system comprises a central processing unit (CPU) 10 coupled via an address and data bus 12 to random-access (RAM) and read-only (ROM) memories 14, 16. These memories may be comprised of one or several integrated circuit devices and may be augmented by a system hard-disk as well as means to read from additional (removable) memory devices, such as a CD-ROM. The present invention is particularly embodied in memory management for a working area of the RAM 14 under control of the CPU 10; a controlling program for this may initially be held in ROM 16 and loaded up with the operating system on power-up.

Also coupled to the CPU 10 via bus 12 are first and second user input devices 18, 20 which may suitably comprise a keyboard and a cursor control and selection device such as a mouse or trackball. Audio output from the system is via one or more speakers 22 driven by an audio processing stage 24. Video output from the system is presented on display screen 26 driven by display driver stage 28 under control of the CPU 10.

A further source of data for the system is via online link to remote sites, for example via the Internet, to which end the system is provided with a network interface 30 coupled to the bus 12. The precise construction of the interface is not an essential feature of the present invention, although it will be recognised that the interface configuration will depend on the type of data network to which the system is to be coupled: for example, where the system is for use by a private home user, the data link is likely to be a telephone connection to a local service provider. In such a case, the interface 30 will suitably incorporate a modem. For other types of data link, such as an ISDN connection, the interface will be configured accordingly.

FIGS. 2 to 7 each schematically represent a number of discrete memory areas from the system of FIG. 1, and in particular a heap memory HM holding a large number of data objects DO for use by various programme threads. The following examples are compliant with memory management techniques in the Java (® Sun Microsystems Inc) virtual machine and the terminology should be construed accordingly: it will be recognised however that the present invention is not restricted to Java-compliant systems, object-oriented language systems, or to purely virtual memory management.

In the arrangement shown, it is the heap memory HM for which garbage collection is performed such that data objects are removed following their last or only reference by a program. Each operating program thread has its own collection of stack frames SF and, to localise the garbage collection process (as will be described), each stack frame is provided with a respective reference stack RS. A handle table HT is provided for carrying pointers identifying data object locations within the heap: it will be noted that, whereas conventional systems constrain all references to heap objects to be routed via a handle table, in the embodiments of the present invention, objects are referenced direct by pointers from both stack frames SF and their associated reference stack RS, such that a handle table may under certain circumstances be avoided, as in the example to be described below with reference to FIG. 7.

Two class structures CL are shown to the right of the heap: these may be referenced by data objects DO in the heap but may not themselves place pointers on data objects. The particular form and functions of the class structures have no bearing upon operation according to the present invention and will not be further described.

Figure 2:
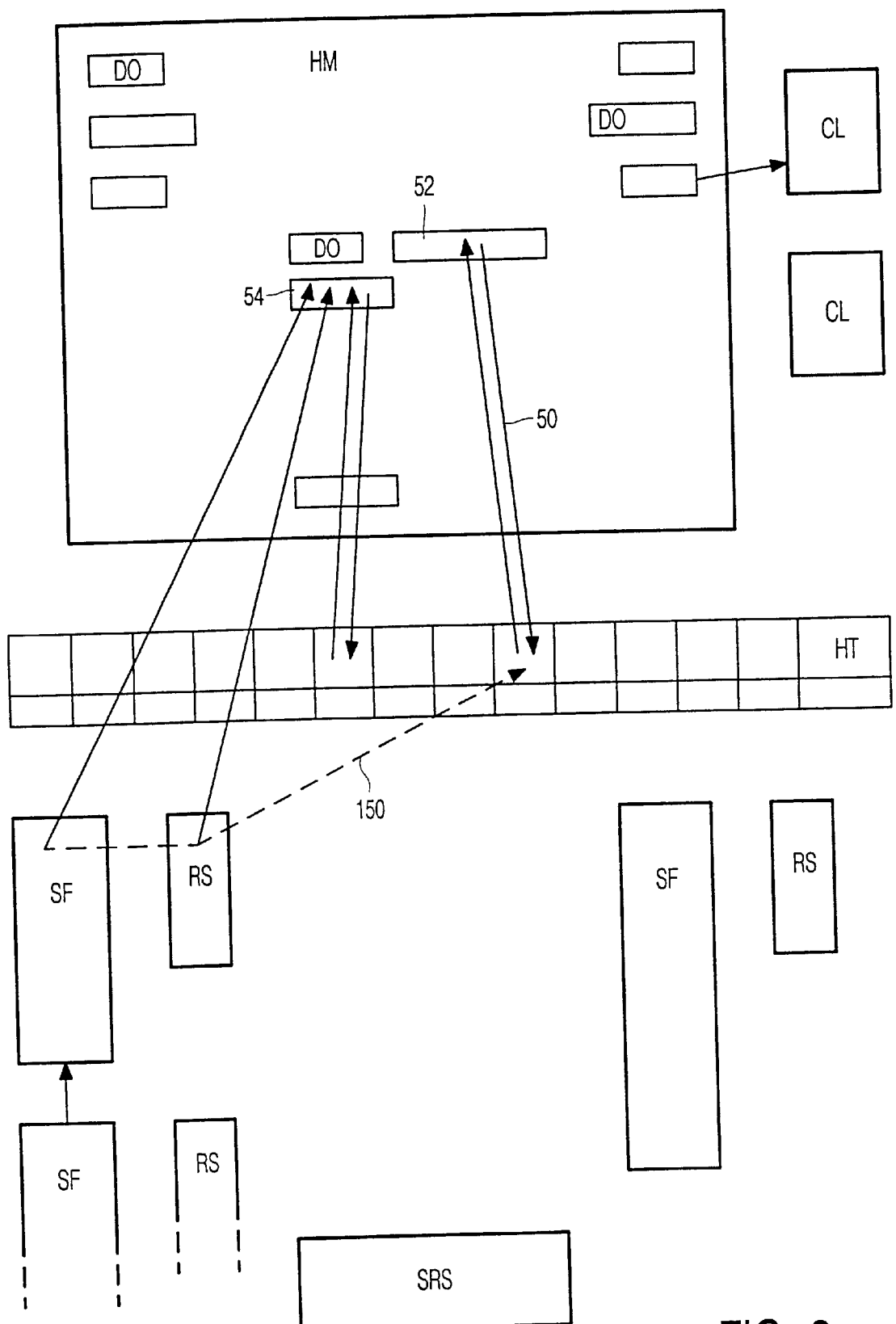
FIGS. 2 to 7 schematically represent functional relationships between general memory and reference stacks of a system such as that of FIG. 1.
Figure 3:
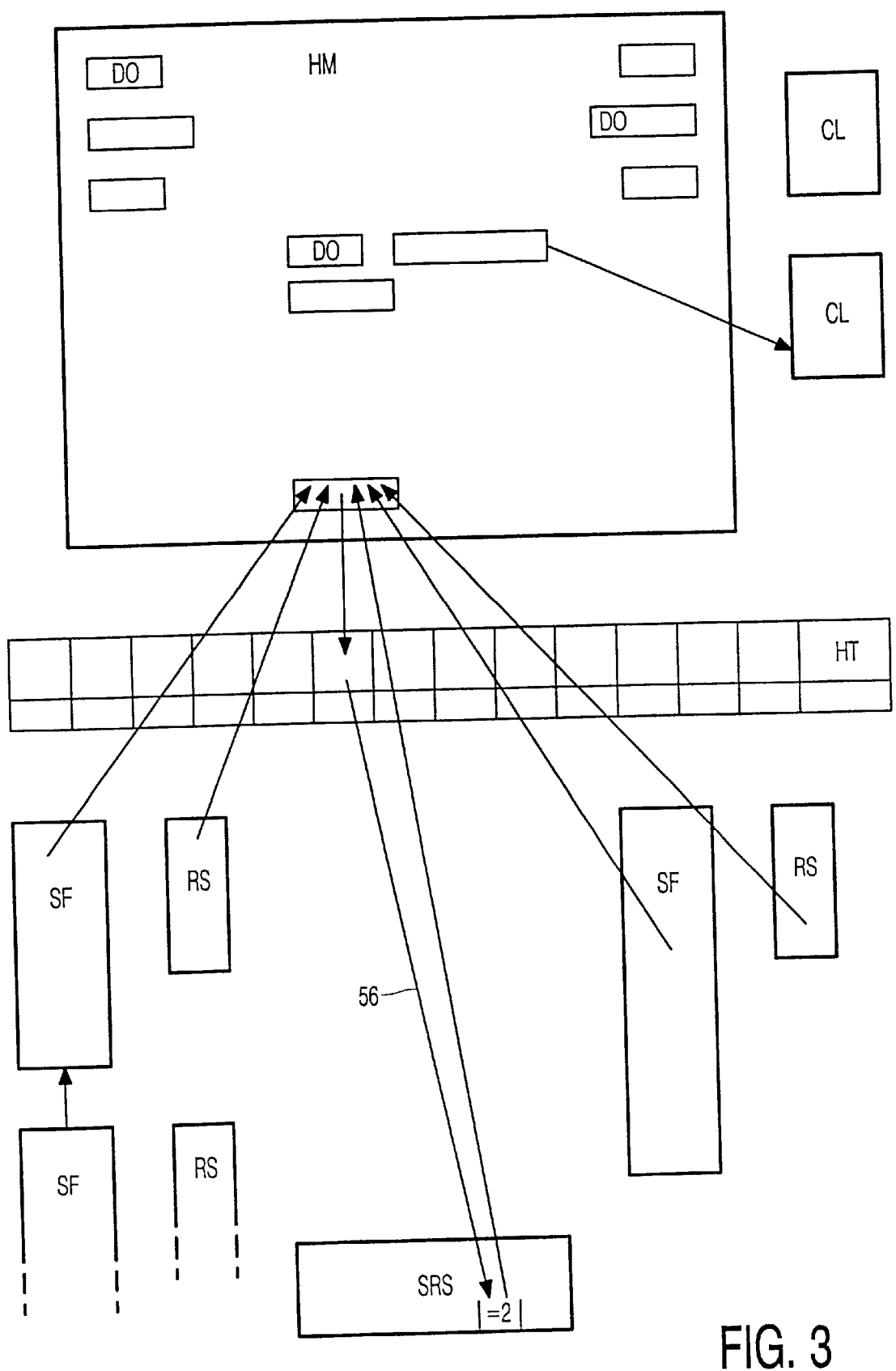

A first embodiment, shown in FIGS. 2 and 3, further comprises a shared reference store SRS (described below) with the various blocks shown functioning as follows. The data objects DO are allocated on the global heap, with the garbage collection process attempting to identify unreachable data objects (i.e. objects having no pointers to them in any stack frame or other data object) and delete them, returning free space for new data objects. Each data object includes a handle pointer 50 back towards the associated handle for this object in the handle table HT, a pointer to the class structure CL for the object, and a series of word-length data fields in the object, or an array.

The use of handle pointers is dependent on the form of the global garbage collection method applied: in some cases it is required for the data objects to be devoid of pointers (class structures being omitted in such arrangements). In such cases, the handle pointer 50 may be omitted with a handle pointer instead being generated from the corresponding object entry in the reference stack RS, as indicated by dashed line 150 in FIG. 2. This arrangement increases the memory required to be assigned to a reference stack but reduces the amount of additional data to be included with each data object and provides greater choice of available techniques for the global garbage handling.

The handle table provides a global table of pointers to data objects. References to objects in fields of other heap objects are in fact indexes into the handle table. The value of the object field varies depending on the circumstance: if there are no stacks RS referencing the object, then it contains a direct reference to the object, as for object 52, FIG. 2. If only one stack has access to the object, then the object field pointer again indicates the object, as for object 54 in FIG. 2. If multiple stacks reference the data object then the handle table field instead contains a pointer 56 to the shared reference structure SRS, as in FIG. 3, which maintains a count of the number of reference stack pointers to an object, together with a pointer back to that object. The handle table entries are updated when the data objects DO have been moved by the compaction process.

The stack frame SF consists of method arguments, local variables, a fixed size operand stack and whatever additional state information is required by the particular system application. For each of the stack entries that is an object reference, an entry for the data object is also added to the reference stack RS for this stack frame. The reference stack itself is a fixed size buffer associated with a single stack frame and consists of pointers to data objects which have been placed on the stack. The maximum number of objects which can be referenced by the stack frame is equal to the size of the stack frame. Therefore the reference stack must be at least as big as the stack frame, but there is no upper limit to its size. If the thread is the only accessor to the object, then there will be only one reference stack entry for that object. Entry into a reference stack 'locks' the data object to its position in the heap HM. Removal from a reference stack 'unlocks' the object for this thread. The compaction process will be allowed to move this object in memory only when there are no locks on the data object.

In the above-described embodiment, whilst additional processing is required for reference-to-stack conversions, all references on stacks are direct pointers and thus the overhead of dereferencing handles is removed for all active data. By use of the reference stacks, local-only data does not need to be processed by a global mark-sweep algorithm before it can be deleted, giving faster turn-around of garbage, which leads to more free memory. Also, since the work of garbage collection of active data is linked to the actual threads that access the data, global garbage collection load is reduced. In order to avoid "accidental" deletion of objects having existing pointers thereto in other heap objects when all reference stack pointers have been removed, a global flag may be carried by each object (or in the associated handle table entry). The global flag is set when pointers exist in other heap objects and prevent deletion of the object during the local garbage clearance operation.

Figure 4:
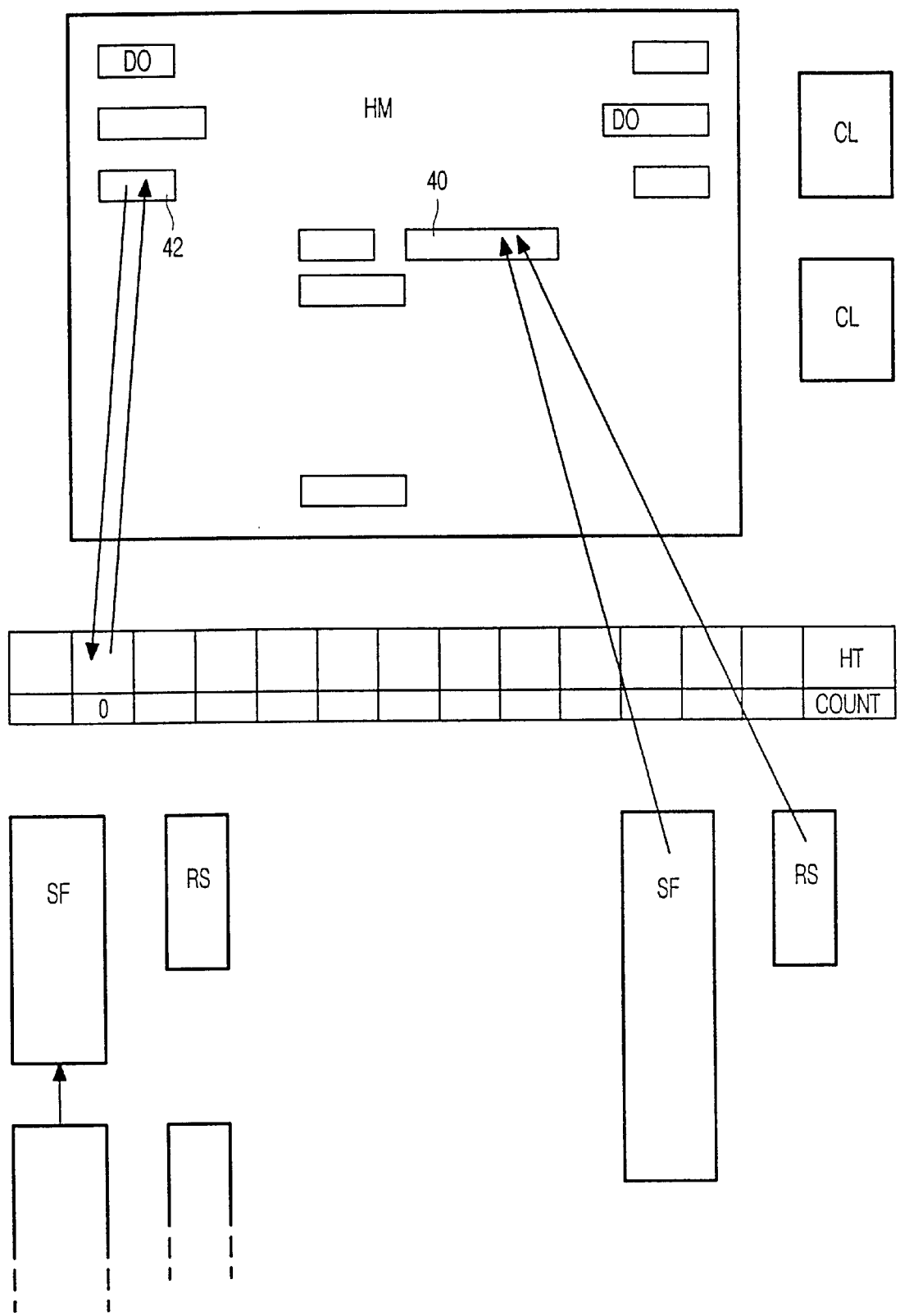
Figure 5:
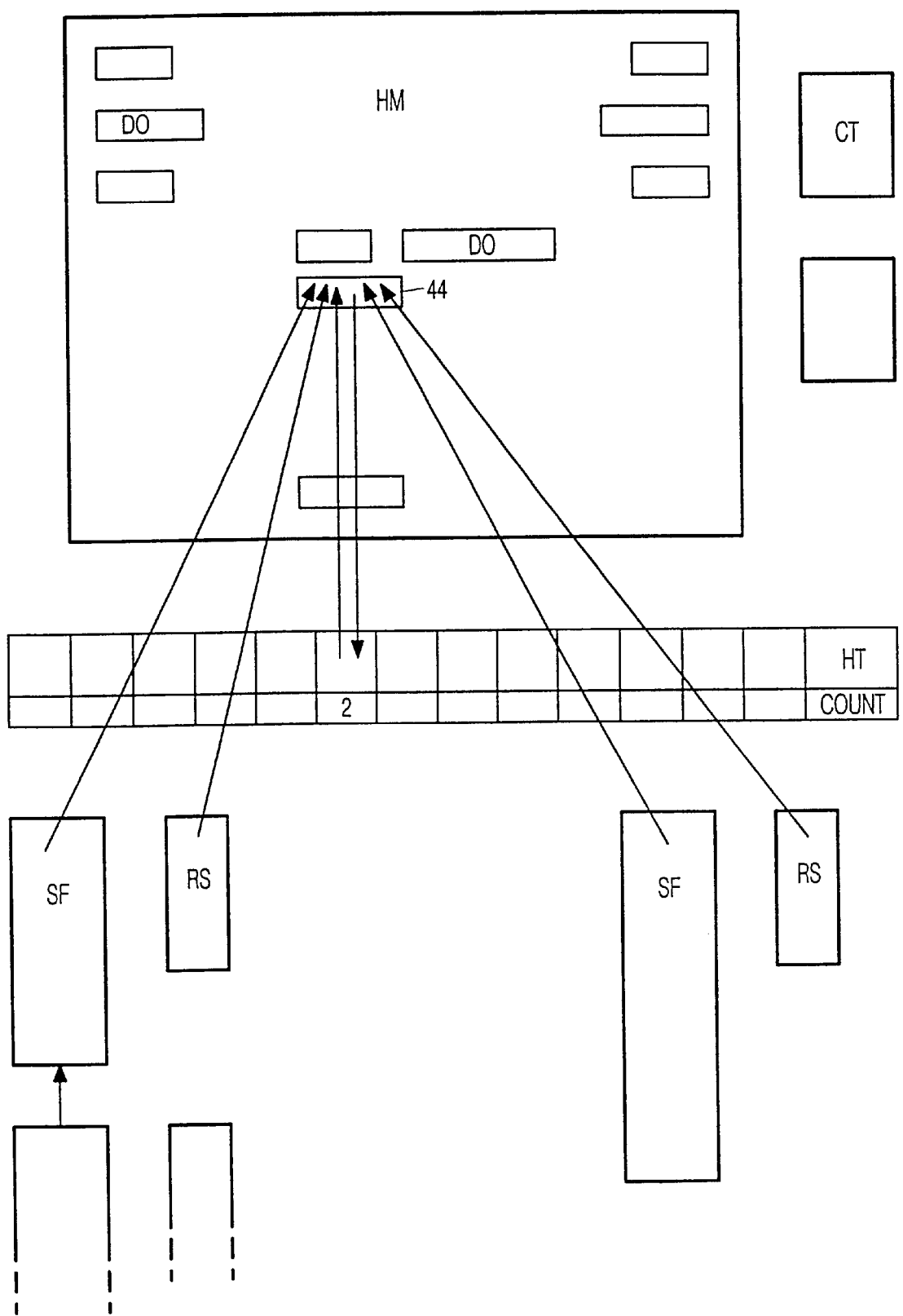

To avoid the necessity to maintain a second object index (in the form of the shared reference store SRS), an alternative embodiment of the present invention—as shown in FIGS. 4 and 5—has the handle data structure HT extended to include a count of the number of references to an object from reference stacks. Objects accessed only from a single stack have no handle and may be deleted immediately by the running thread at the conclusion of the stack frame, as for object 40, FIG. 4. Objects with a reference count of zero, such as at 42, are not 'active' in that there are no direct references to the object, and are therefore moveable by compaction, although the compactor must update the object field in the handle once the data object has been moved. Objects such as at 44 in FIG. 5 are active in that there are direct references from a number of reference stacks (reference count 2 for object 44) and are locked, not being moved during compaction.

As the reference stacks RS are of fixed size, in extreme cases where a stack frame refers to a large number of data objects, a reference stack may overflow. On detecting that a reference stack is reaching fullness, a localised garbage collection operation is performed for the reference stack contents. The collection operation suitably begins with the creation of a new reference stack, following which the existing stack contents are read in bottom-up order and those entries that are still valid (objects that are still referenced) are moved to the new stack. Having formed the new stack, the remaining objects in the old stack are unlocked and, if not shared with any other reference stack, they are deleted. When the new reference stack is made active (succeeding stack frame objects are referenced from the new reference stack) the old stack is deleted. It will be recognised that some variations to this procedure are possible: for example, when creating references in a new reference stack, a check may be made as to whether or not the handle field for that object has a null value. If so, the object is locked prior to the deleting of objects with a null handle field in the old reference stack (and unlocking of others) to prevent accidental loss.

Figure 6:
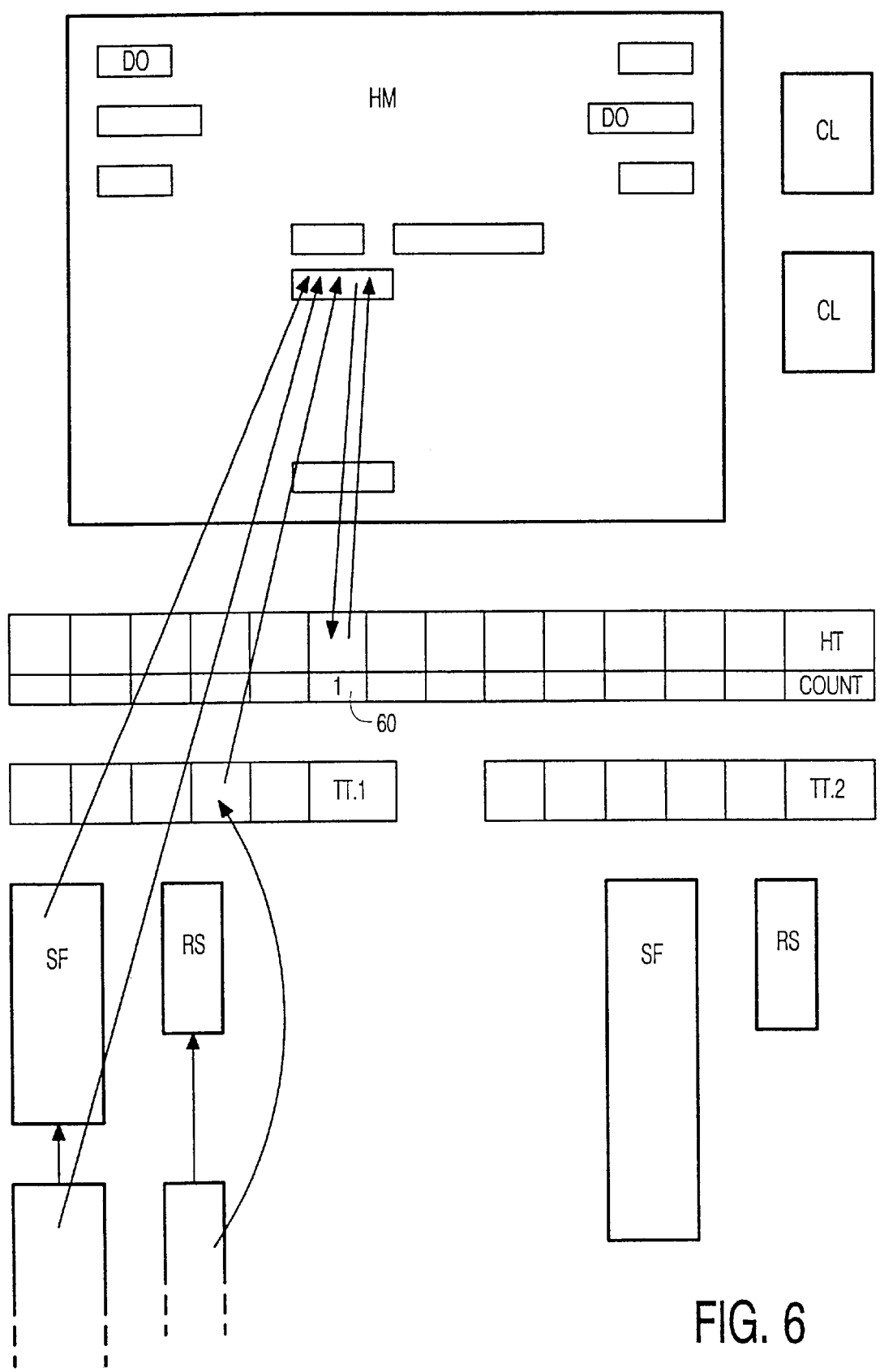
Figure 7:
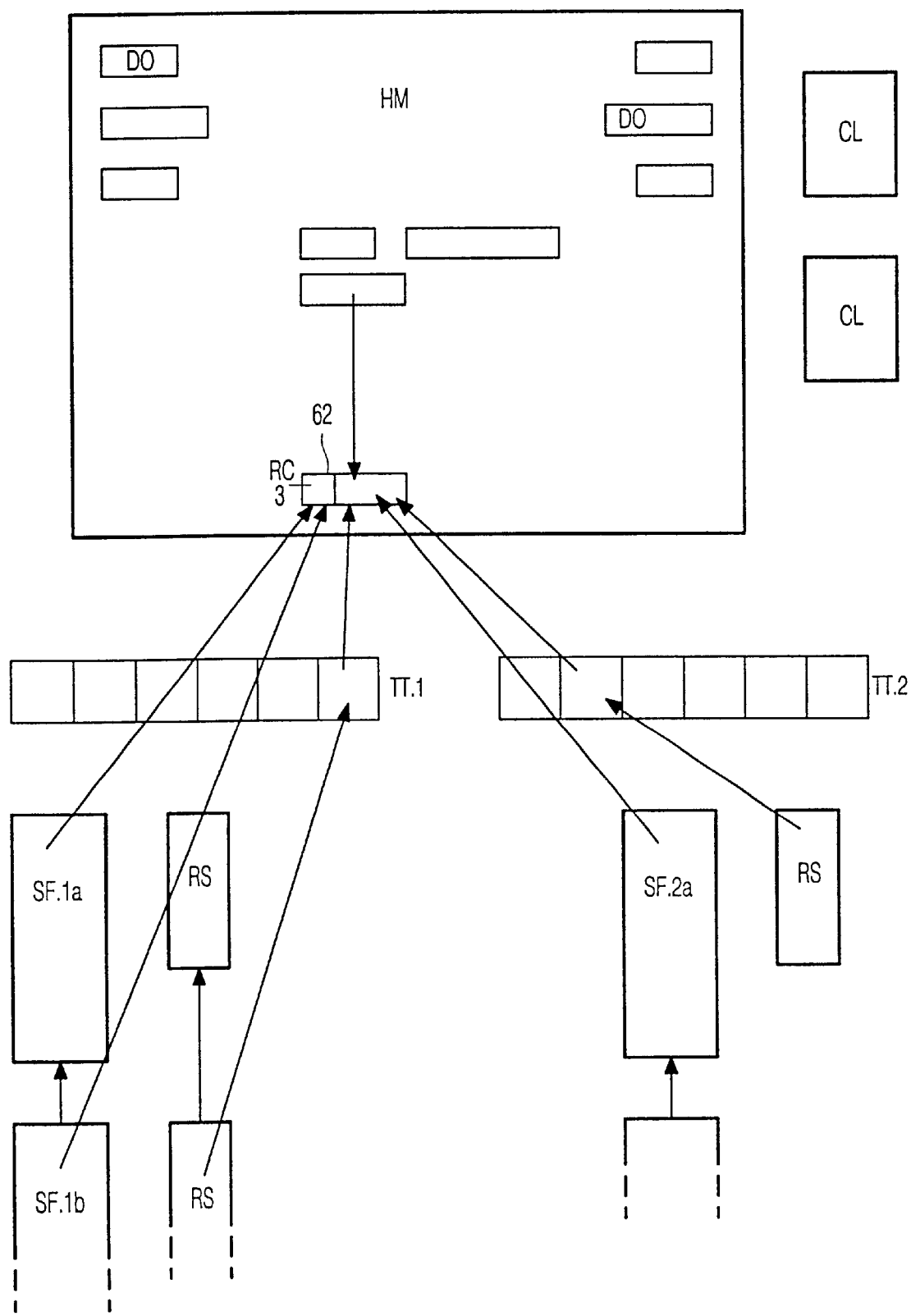

Two further embodiments are illustrated in FIGS. 6 and 7. The principal difference in comparison with the preceding embodiments is the provision of a specific table TT for each thread (hereinafter a "thread table") holding for a given instant all the data objects that may be accessed by the thread at that time, such as to split the functionality of the above-described reference structures into per-stack-frame reference buffers or stacks and per-thread thread tables. For garbage collection purposes, the thread table is used to mark all objects referenced by that thread. The table contains no duplicate entries and, for each entry in the thread table, there is exactly one reference buffer entry in that thread referring to the object. The reference buffer RS containing the reference is associated with the lowest stack frame SF that could contain the reference: it is possible that references to the object in the lowest stack frame may get overwritten, although this will be detected by the local garbage collection process when the stack frame is destroyed or the reference buffer overflows. As before, entries are passed down the stack when references are returned from functions.

A stack write barrier function tests whether a reference is already present in the thread table and, if not, it is inserted into both the thread table and the active reference buffer. The thread table is organised for efficient insertion and analysis, by optimisation for rapid look-up operations.

In the embodiments of FIGS. 6 and 7 there is no explicit distinction between local and global objects. An object may be considered local if it is uniquely referenced by a single thread reference table. The garbage collection system may use a reference counting method to identify when the total number of references, from thread tables and from other objects, falls to zero and then delete the object. As with previous embodiments, this reference count could be stored in a global handle table, as at 60 in FIG. 6 or, where the handle table is omitted as in the embodiment of FIG. 7, the reference count may be included in the object itself, as indicated at 62. During garbage collection, reference buffers RS are flushed as before, but when a reference is removed from a buffer, the respective entry in the thread table TT is also cleared. The garbage collection system suitably uses this event as the trigger to decrement the reference count for the object.

The reference buffers may be implemented simply as a stack for this model. However, to facilitate rapid processing of reference buffer overflows, the buffer may undergo sorting and searching operations during its lifetime. To accomodate this, the reference stack for a thread could be held in an array and, in normal operation, would have stack semantics—that is to say support for push operations only: during local garbage processing, however, particular stack frames may be sorted for more efficient searching.

The use of thread tables TT is similar to having separate handle tables for each thread. However, it is not a replacement for a handle table, and both tables can be used in the same system, as in the embodiment of FIG. 6. The thread table should rather be considered as an interface to a stack for garbage collection purposes, supporting low-overhead reference counting and removing the need for conservative scanning of the stack.

With the embodiment of FIGS. 6 and 7, using thread tables, a safe explicit delete operation can be used on stack variables. The objects may be safely deleted if the following checks are all successful:

there is a reference in the active reference stack;

there are no references in the current stack frame other than those involved in the delete operation itself;

the reference count for the object indicates that there are no other references to the object.

Local garbage collection methods can be used in connection with the known technique of generational (or "ephemeral") garbage collection, in which a set of objects is partitioned on the basis of the object ages. Based on the reasoning that the majority of objects will fall redundant whilst young, greater effort is expended in the collection for the younger generation. A possibility is to have common older generations, but split the youngest generation into local groups for each thread. The local reference structures can act as the root set for the local/young groups, and the transition of objects from local to global results in promotion of the object from the local group to the next generation.

Whilst described in terms of example embodiments, it will be recognised that a number of variations are possible, for example tuning the reference buffer (reference stack RS) size. As local garbage is collected at procedure exits or when the reference buffer overflows, adjusting the size of the reference buffer is a way of managing the balance between recycle periods and garbage collection overhead. Overflows may cause a short pause in execution of the current thread while locking and deletion operations occur, and the larger the reference buffer, the longer these pauses will become: large reference buffers for methods that do not generate garbage are wasteful, although setting the size of the reference buffer too close to the minimum may lead to frequent overflows and a high processing overhead.

With the reference buffer configured as a stack (as the most straightforward structure for the buffer), duplicate entry detection is required to avoid redundant reference count operations. A small queue for objects to be unlocked may be used—lock operations on objects waiting to be unlocked could be detected and both operations would be cancelled. An alternative to the use of a stack would be to have a hashtable reference buffer, although the extra complexity is a negative factor, but a reasonable hashing function may offset the extra processing cost with the reduced number of duplicated lock operations.

From the foregoing, it will be seen that we have provided an improved garbage collection technique having extra facilities in comparison with known techniques for identifying local data and allowing immediate collection of this data as a thread-local task. The embodiments described herein give the additional advantage of removal of the indirection through the handle table for data referenced from the stack, at the cost of extra, but finite, memory overhead. Although described principally in terms of embodiment in a software-driven implementation, the skilled reader will be well aware however, that the above-described functional features could equally well be implemented in hardware, or a combination of hardware and software.

From reading the present disclosure, other modifications will be apparent to persons skilled in the art. Such modifications may involve other features which are already known in the design, manufacture and use of data processing and/or storage apparatus and devices and component parts thereof and which may be used instead of or in addition to features already described herein. For example, a cache may be used in place of the stack. A cache has the characteristic of very fact access, at the expense of a risk of ignoring local objects if there is a cache conflict. This, however, is still acceptable because the main garbage collection operation may deal with anything that leaks from the cache. Although claims have been formulated in this application to particular combinations of features, it should be understood that the scope of the disclosure of the present application also includes any novel feature or novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A data processing apparatus for handling multi-thread programs, the apparatus comprising a data processor coupled with a random-access memory containing a plurality of data objects, each said data object being at a respective known location within the memory and being accessed via respective pointers carried by one or more caches associated with respective threads, the apparatus being configured to periodically determine those data objects in the random-access memory having no extant pointers thereto from any source and to delete the same;

wherein the apparatus further comprises a plurality of reference buffers, each assigned to a respective cache, each reference buffer holding pointers to each data object referred to by the respective cache, the apparatus being configured to clear, at the conclusion of each thread cache, the associated reference buffer and each referenced data object having no pointers thereto in any other reference buffer.

2. Apparatus as claimed in claim 1, further comprising an additional data store holding a handle table, with each handle table entry holding a pointer to the location within the random access memory of a respective data object.

3. Apparatus as claimed in claim 2, wherein each referenced data object contains a pointer to the respective handle table entry.

4. Apparatus as claimed in claim 2, wherein each reference buffer holds, for each referenced data object, a pointer to the respective handle table entry.

5. Apparatus as claimed in claim 2, further comprising means operable to determine the number of pointers from reference buffers to each data object and to store this number as a reference count with the entry for that data object in the handle table.

6. Apparatus as claimed in claim 2, further comprising means operable to determine the number of pointers from reference buffers to each data object, and a further data store holding this number as a reference count entry for the respective data object, with the handle table pointer to the data object location being comprised of a pointer to the further data store reference count entry and a further pointer from said entry to the data object in the random access memory.

7. Apparatus as claimed in claim 5, further comprising means arranged to periodically compact the random access memory contents by moving the undeleted data objects, said means leaving unmoved any data object with an associated reference count value greater than zero.

8. Apparatus as claimed in claim 7, wherein each stored data object includes a lock flag which, when set, indicates to the said means arranged to periodically compact the random access memory contents a reference count value greater than zero.

9. Apparatus as claimed in claim 1, wherein each stored data object includes a global flag set by the presence of a pointer to the data object from another data object, the apparatus being further configured to exclude from clearance any data object having its global flag set.

10. Apparatus as claimed in claim 1, wherein each reference buffer is of a predetermined capacity, the apparatus further comprising means operable to detect when a reference buffer reaches fullness and arranged to perform garbage clearance for the buffer prior to conclusion of the thread stack frame.

11. Apparatus as claimed in claim 1, additionally comprising a further data store holding, for each thread, a respective thread reference table holding individual entries respectively marking each object referenced by the thread.

12. Apparatus as claimed in claim 11, wherein each reference buffer holds, for each referenced data object, a pointer to the respective thread table entry.

13. A method of memory management for use in data processing apparatuses handling multi-thread programs, wherein the memory contains a plurality of data objects, each said data object being at a respective known location within the memory and being accessed via respective pointers carried by one or more caches associated with respective threads, the method comprising periodically determining those data objects in the random-access memory having no extant pointers thereto from any source and to delete the same,
   wherein for the one or more caches, reference pointers are generated for each data object referred to by the one or more caches and, at the conclusion of each thread, the associated reference pointers and each referenced data item having no other reference pointers thereto are deleted.

14. A method as claimed in claim 13, comprising the further step of periodically compacting the data object memory contents.

15. A method as claimed in claim 14, wherein those stored data objects having reference pointers thereto are identified as locked and are not moved as a result of the compaction process.

* * * * *